United States Patent [19]

Sanzone

[11] Patent Number: 4,813,818

[45] Date of Patent: Mar. 21, 1989

[54] APPARATUS AND METHOD FOR FEEDING POWDERED MATERIALS

[76] Inventor: Michael Sanzone, 1570 Belle Plaine, Waukegan, Ill. 60085

[21] Appl. No.: 89,215

[22] Filed: Aug. 25, 1987

[51] Int. Cl.[4] .............................................. B65G 53/40

[52] U.S. Cl. ...................................... 406/122; 406/16; 406/73; 406/145; 425/447; 425/78; 141/250

[58] Field of Search ....................... 406/16, 17, 18, 25, 406/41, 73, 122, 124, 145, 151; 141/250, 258, 311 R, 352, 387, 363, 364; 425/447, 78, 546, 258, 260, DIG. 60

[56] References Cited

U.S. PATENT DOCUMENTS

| | | | |
|---|---|---|---|
| 2,170,469 | 8/1939 | Carter | 226/116 |
| 2,259,465 | 10/1941 | Hardy | 425/546 X |
| 2,443,182 | 6/1948 | Carter | 226/116 |
| 2,608,335 | 8/1952 | Rohdin | 141/250 |
| 2,690,865 | 10/1954 | Fischer et al. | 226/116 |
| 2,718,345 | 9/1955 | Howard | 226/69 |
| 2,738,119 | 3/1956 | Haycarth | 226/116 |
| 2,756,906 | 7/1956 | Carter | 226/203 |
| 2,839,787 | 6/1958 | Stevens | 141/250 X |
| 3,183,570 | 5/1965 | Vogt | 425/260 X |
| 3,941,169 | 3/1976 | Bassani | 141/61 |
| 4,133,281 | 1/1979 | Holmes et al. | 141/1 |
| 4,286,937 | 9/1981 | Ahrens | 425/546 X |
| 4,351,373 | 9/1982 | Mechalas | 141/51 |
| 4,556,090 | 12/1985 | Pujari | 141/250 X |

FOREIGN PATENT DOCUMENTS

| | | | |
|---|---|---|---|
| 919871 | 4/1982 | U.S.S.R. | 425/260 |
| 1069950 | 1/1984 | U.S.S.R. | 425/78 |

*Primary Examiner*—Sherman D. Basinger
*Assistant Examiner*—Paul E. Salmon
*Attorney, Agent, or Firm*—McCaleb, Lucas & Brugman

[57] ABSTRACT

A vacuum assisted feeding apparatus for delivering finely pulverized particulate materials, such as powdered metal, is disclosed in which a material holding hopper has a feeder tube extending into a lower disposed filling chamber subject to sub-atmospheric pressures to effect vacuum assisted gravity flow of the powder material into the filling chamber. Powder in the filling chamber is vacuum/gravity fed to a mold cavity until the cavity is filled, whereafter powder is accumulated in the filling chamber until the discharge end of the feeder tube is occluded by the powder to disrupt the feeding operation.

4 Claims, 4 Drawing Sheets

APPARATUS AND METHOD FOR FEEDING POWDERED MATERIALS

This invention relates generally to feeding systems and more particularly to improved apparatus and a method for feeding and depositing finely divided or pulverized particulates, such as powdered metals and the like.

BACKGROUND OF THE INVENTION

In the powder metallurgy art various products are formed by pressing finely ground powders into a desired shape within a die cavity. According to one known procedure the metal powders are compacted in the die cavity at room temperature and the semi-dense compact is then removed from the die and heated to bond the powders into a unified mass. The heat bonding procedure is generally referred to as sintering.

By another procedure the pressing and sintering steps are combined in one operation in a preheated die.

Whichever of these or similar procedures is employed, means are required for delivering measured amounts of powder or particulate to a die cavity. Because many of the powdered materials are very heavy and dense, they have a marked tendency to self compact, making simple gravity feed methods inadequate and unsatisfactory. Shaking or vibrating a feed hopper is frequently employed for inducing flow of the particulate. This, however, is time consuming and inaccurate in delivering a measure weight or amount of materials to the die cavity.

In addition, shaking of the fine powders dislodges "fines" and dust from the powder which are then air borne to coat and contaminate the surrounding environs. Inasmuch as many of the powdered materials are frequently quite costly and in some cases toxic, the dust problem can represent a considerable economic loss unless recovered to say nothing of the health hazzard created by the dust. Consequently, relatively elaborate and costly dust recovery systems and personnel safety precaution, such as filtered masks are resorted to, by present day practice.

BRIEF SUMMARY OF THE INVENTION

In recognition of the above outlined problems and shortcomings of current practice, particularly as they relate to the powder metallurgy art, the present invention, presents an improved feeding system and apparatus which also is applicable to the feeding of particulate materials other than metal powders. For example, it is fully contemplated that this invention is useful in the handling of plastics, pharmacuticals, precious minerals, dry chemicals and other particulates of similar nature.

In brief this invention concerns improved apparatus and procedures for feeding finely divided particulate materials to a selected destination. To this end the apparatus comprises a hopper receptive of particulate from a supply source which communicates with an underlocated enclosed filling chamber via a feeder tube downwardly inclined to the horizontal.

The filling chamber housing is equipped with means providing sealing engagement with an underlying planar surface and means for effecting selected sub-atmospheric pressures within the chamber. Evacuation of the chamber initiates vacuum assisted gravity flow of the particulate through the inclined feeder tube to deposit materials within the filling chamber.

By loading the chamber with particulate to a level sufficient to occlude the discharge end of the feeder tube, flow of the particulate, is disrupted. Regulating the level of the feeder tube discharge end causes generally uniform measured amounts of particulate to be deposited in the filling chamber.

In a preferred embodiment, the filling chamber and an attached hopper are reciprocated to and from an underlying die cavity in a die press; the chamber housing having sealing engagement with a planar surface surrounding the upper end of the die cavity. Evacuation of the filling chamber serves to evacuate the die cavity as well whereby metal powder entering the chamber is vacuum assisted into the die cavity in a dust free manner, filling the die cavity uniformly to effect uniform weight and density of material in the end product.

One important object of this invention is to provide improved apparatus for feeding particulate materials, especially heavy metal powders, from a supply source to a desired destination.

It is another important object of the invention to provide a new and improved method of filling a forming die cavity with powdered materials.

Another object of this invention is to provide improved apparatus for feeding powdered metal to a die cavity in which the powdered metal is caused to flow by reason of gravity and sub-atmospheric pressures.

Still another object of this invention is to provide a system for feeding powdered metals and like particulate materials which promotes operator safety.

A further object of this invention is to provide an improved apparatus and procedure for handling finely divided particulate materials, such as powdered metal, which minimizes particulate loss and dust contamination of the atmosphere.

Another object of this invention is to provide improved feeder apparatus for handling powder materials which is economical and safe to use and operate.

Having described this invention, the above and further objects, features and advantages thereof will appear from time to time from the following detailed description of a preferred embodiment thereof, illustrated in the accompanying drawings and representing the best mode presently contemplated for enabling these skilled in the art to make and practice this invention.

IN THE DRAWINGS

DESCRIPTION OF THE PREFERRED EMBODIMENT

Figures 1, 2:
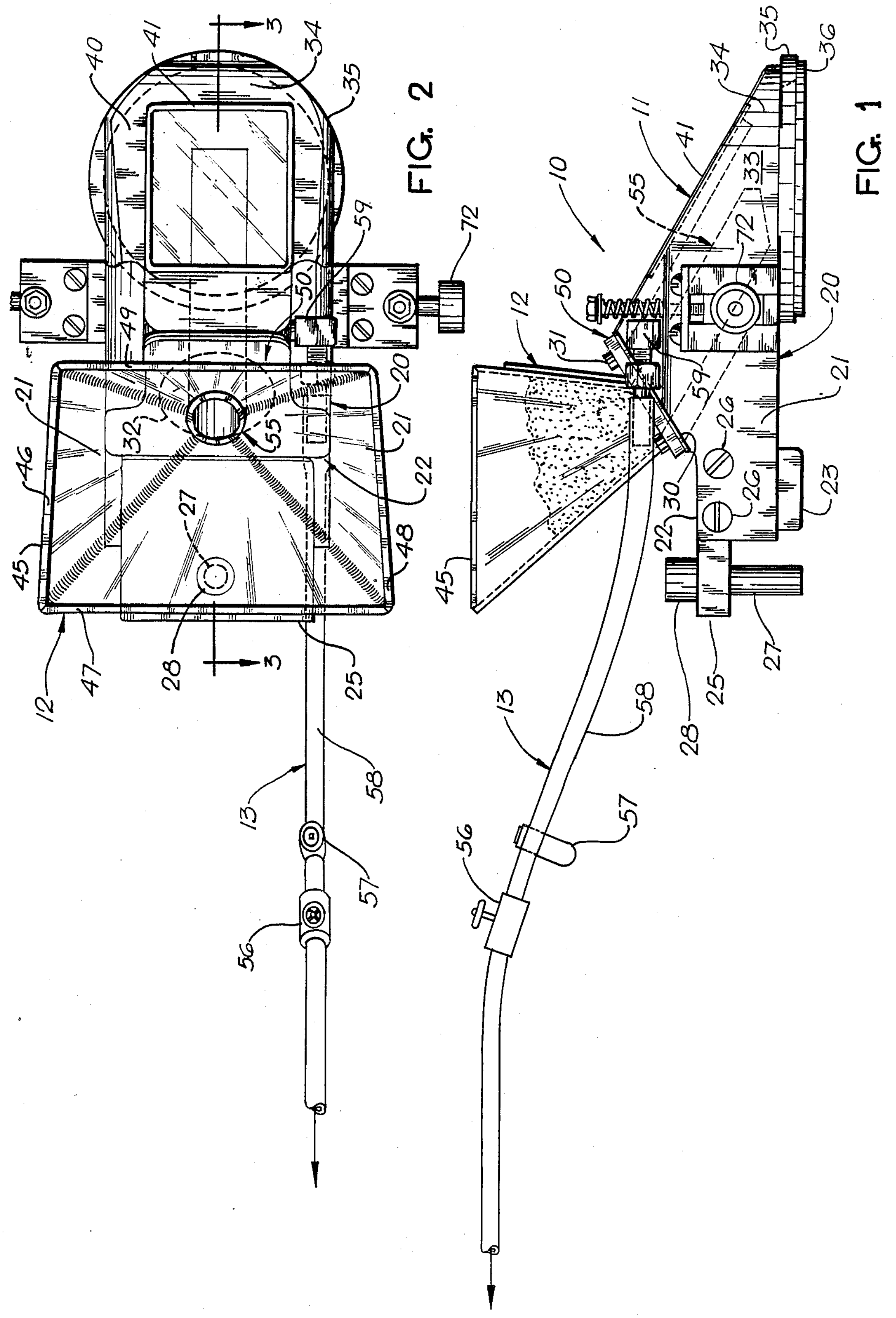
FIG. 1 is a side elevation of feeder apparatus according to this invention.
FIG. 2 is a top plan thereof.
Figure 3:
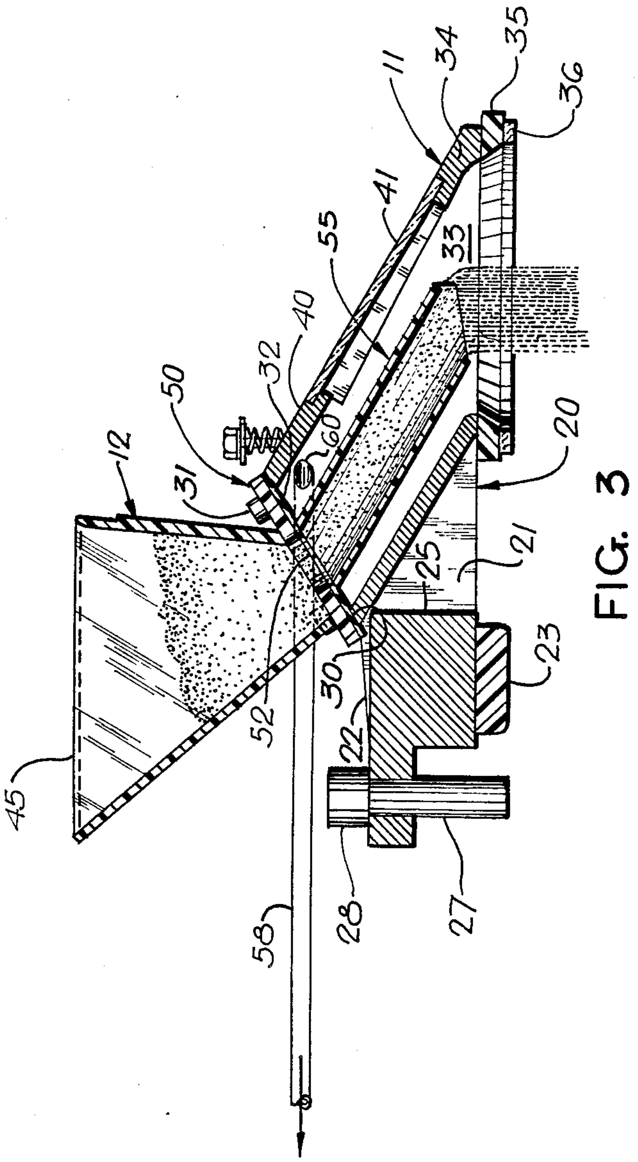
FIG. 3 is a longitudinal cross section taken substantially along vantage line 3—3 of FIG. 2.

Turning now to the preferred embodiment illustrated in the drawings, initial reference is made to FIGS. 1–3, wherein the features of feeding apparatus, generally designated 10, are illustrated. As hereinafter described apparatus 10 is related to the feeding and delivery of relatively heavy powdered metals for a die formed, compact or billet. The teachings of this invention, however, are not restricted to the handling of metal powders, but are equally applicable to the feeding and deposit of various weights and types of powdered particulates involving comparative feeding problems and conditions, met by this invention.

As shown, apparatus 10, generally comprises feed shoe means 11, hopper means 12 and vacuum means 13 organized to cooperate with means, such as a pneumatic piston/cylinder or mechanical linkage for selectively reciprocating the feeding apparatus as will appear more clearly in association with the operational description hereinafter.

Shoe means 11 preferably is constructed as a lightweight metal casting of aluminum or aluminum alloy to include a rearwardly extending tail section 20 having a pair of laterally spaced side walls 21, 21 depending from a planar top wall 22 thereof. A pair of slide members 23 made of long wearing, relatively slippery plastic, such as Nylon or Teflon extend from the bottom side of a connector block member 25, located between and loosely or pivotally attached to walls 21, 21 by fasteners 26 for ready removal. Member 25 is operationally joined to a source of reciprocating motion in the illustrated case, so that apparatus 10 may be translated linerally in operation to and from a die cavity for the production of powdered metal products as will be explained more fully hereinafter. For that purpose an opening 27 is provided in member 25 to accept a connector pin 28 for coupling member 25 to a reciprocating actuator (see FIGS. 4–7).

The upper wall 22 of the tailpiece is intersected by an angularly disposed planar flange wall 30 having tapped openings receptive of machine screws 31 for connecting the hopper means to the shoe means 11, as will be amplified presently.

The flange wall 30 has a central opening 32 which communicates with the upper end of an interior filling chamber 33 formed within a nose portion 34 of the shoe means. Chamber 33 is open over its lower side defined by an annular flange 35 in the illustrated instance (see FIG. 2). An annular seal 36 of felt or similar material is inset into the bottom side of the flange 35 to engage an underdisposed planar surface in operation; the bottom face of the seal ring 36 and the slides 23 being coplanar, to maintain shoe 11 in a generally horizontal or level condition.

Of particular note to the successful operation of the shoe 11 with an overdisposed die punch employed in a typical die press for forming powder metal parts, is the provision of an angularly disposed upper nose wall 40 on portion 34. Such sloping wall permits closer interpositioning of the feeding apparatus 10 and upper die punch to shorten travel time of the latter in operation.

Additionally, to enable the operator to observe the die cavity filling operation, nose wall 40 is distinguished by a transparent window 41, preferably of clear plastic, cemented in place over a large opening in nose wall 40; revealing the upper side of the filling chamber 33. Window 41 also provides means protecting th eupper die punch against breakage in the event the punch accidently lowers during the die filling operation when apparatus 10 is placed over the die cavity directly beneath the die punch.

Hopper menas 12, as best shown in FIGS. 1–3, comprises a clear sided, open top, funnel shaped portion 45 formed by four angularly intersecting transparent walls 46–49, in the illustrated case. Other shapes for the funnel portion, such as frusto-conical may be used. The transparent walls of the funnel portion provide means for regulating the filling of the funnel, either by eye or with automatic controls (not shown) operable to shut off the powder supply when a desired level is reached in the funnel portion.

At the convergent ends of the funnel walls, is a planar transverse connector flange 50 disposed at an appropriate angle to parallel the flange wall 30 of the shoe means when attached thereto over an intervengin gasket 52, by the means of the machine screws 31. So mounted the upper end of the hopper funnel portion is operationally horizontal as shown in FIG. 1.

The apex of the sloping funnel portion opens to one end of a downwardly inclined cylindrical feeder tube 55 which extends into the filling chamber 33 (see FIGS. 1 and 2). Tube 55 preferably lies along an axial incline of substantially 30° to the horizontal for optimum flow of powder materials thererthrough. It should be noted that the outer or lower end of the feeder tube terminates within chamber 33 at a selected height above the bottom of that chamber, depending on the extent to which the filling chamber is to be filled.

As noted previously, the weight and finely ground nature of the powdered materials, particularly metal powders, substantially negates their natural gravity flow. Thus in present practice shaking or vibrating the hopper is employed to effect flow of the powder into the filling chamber. By the present invention such shaking or vibrating assist to the feeding operation is eliminated by virture of the vacuum means 13.

Means 13, as best shown in FIG. 1, comprises a vacuum pump (not shown) control valve means 56, adjustable line filter 57 and a flexible vacuum line or hose 58 joined to a tube fitting 59 attached to the shoe means 11 and communicating with passageway means 60 leading to the filling chamber 33. With this arrangement, activation of the vacuum means 13, serves to evacuate filling chamber 33, as well as any die cavity disposed beneath such chamber. At the same time, the sub-atmospheric pressures or vacuum within the filling chamber draws the powdered materials from the hopper means and filling tube into the filling chamber and die cavity communicating therewith. Once the die cavity is filled, powder builds up within the filling chamber 33 until the lower end of feeder tube 55 is covered by the powder. This disrupts further discharge of material from tube 55. Activation an deactivation of the vacuum means is controlled by valve means 56, which may be manual, as shown, or automatically responsive to positioning movement of the shoe means 11.

The intensity of the vacuum may be regulated to desired sub-atmospheric pressures within the skill of the art, but is fundamentally determined by the weight and flow characteristics of the particulate or powder being handled.

USE AND OPERATION

Having described the basic structural features of feeding apparatus according to this invention, its use and operation in conjunction with a die press to form powder metal products will be understood from the schematic showing in FIGS. 4–7.

Figure 4:
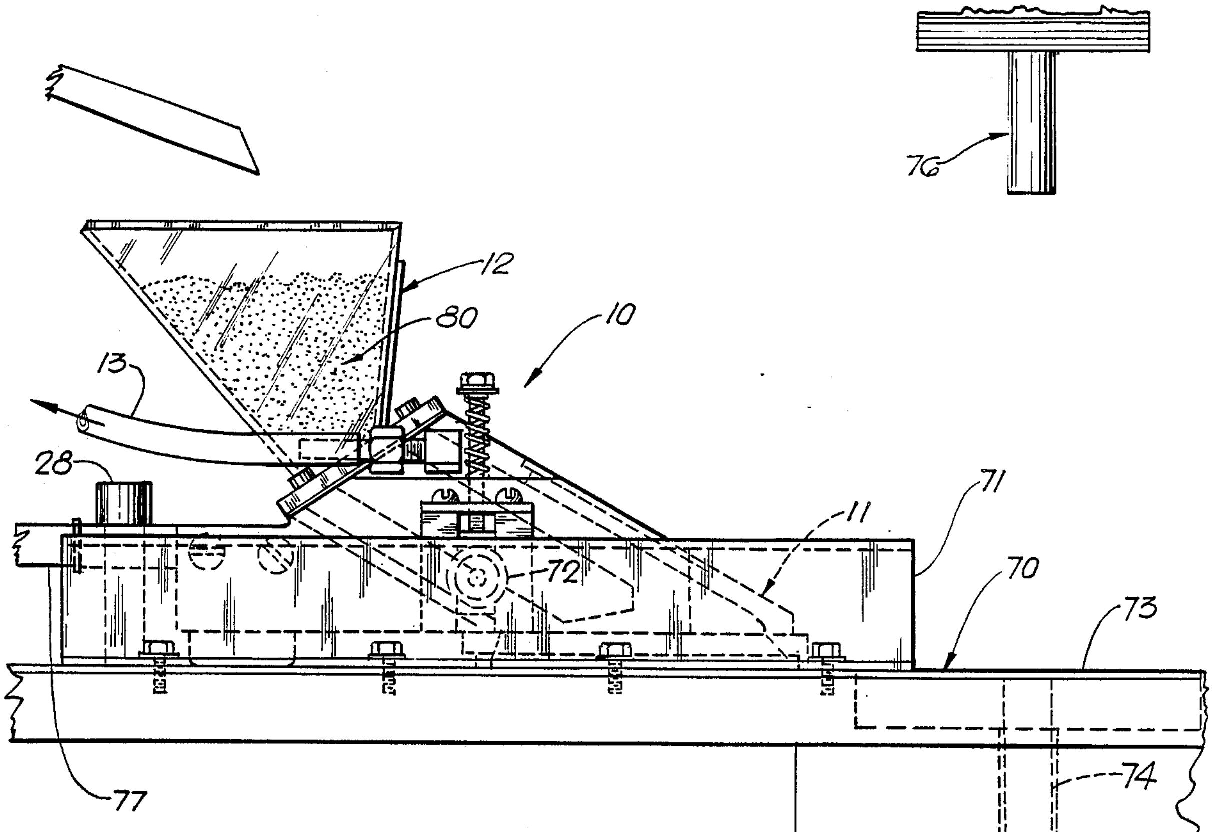
FIGS. 4–7 are schematic illustrations demonstrating the operational sequence when using the apparatus of FIGS. 1–3 in a die press.

As seen in FIG. 4, apparatus 10 is positioned atop a planar die table 70 equipped with parallel spaced hold downguide rails 71 engaged by spring loaded rollers 72 extending from opposite sides of the shoe means 11. Thus the shoe means is adapted to move over the table 70. A forming die 73 having a die cavity 74 closed at its lower end by a power activated bottom punch 75 is mounted in die table 70. Cavity 74 is in coaxial alignment with an upper ram actuated punch 76.

The hopper means 12 is shown filled with powder 80 (for example, carbide) to a predetermined level and reciprocating means 77 attached to block 25 by pin 28 is ready to advance shoe means 11 over the die cavity 74 (shown filled by lower punch 75 because of the lowered position of die table 70).

Figure 5:
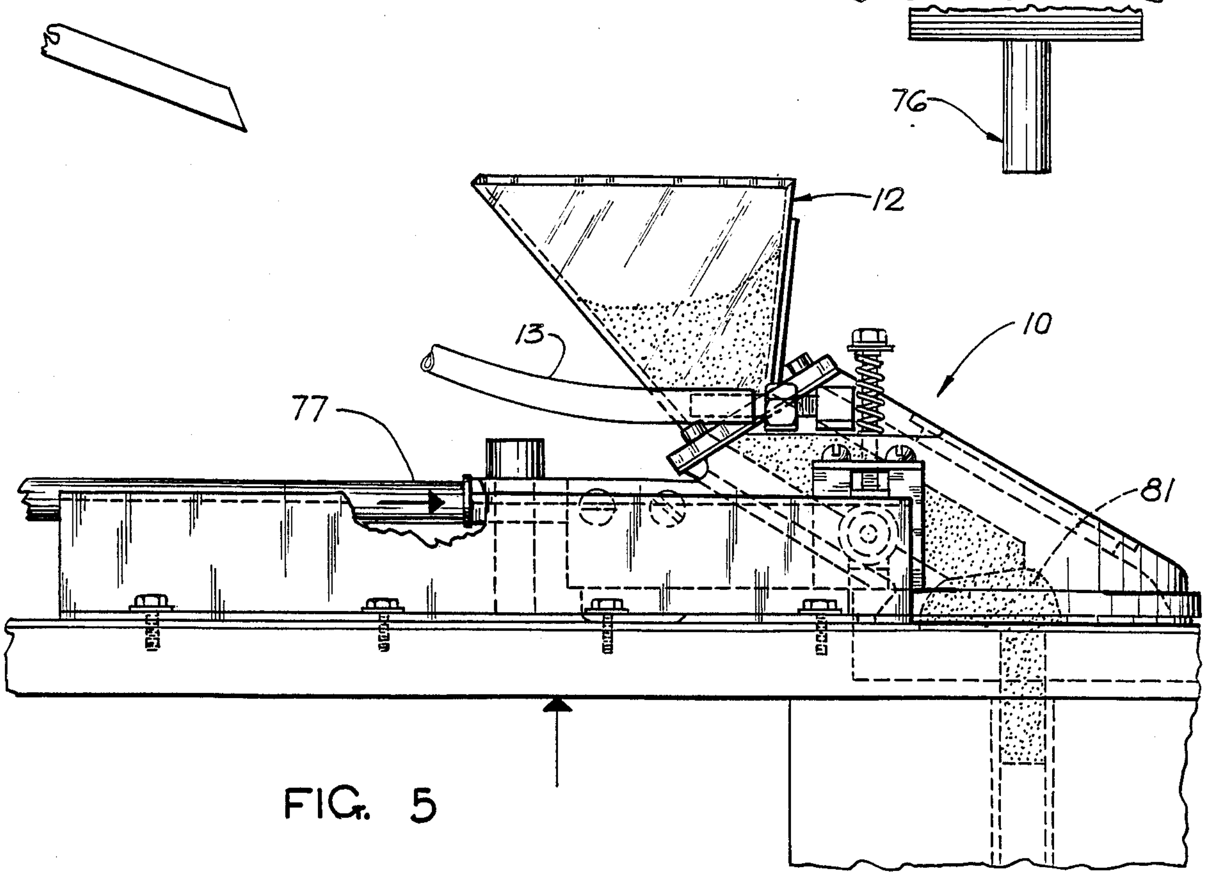

FIG. 5 shows apparatus 10 in a forward position whereat filling chamber 33 is registered over die cavity 74, which is gradually increased in volume by raising the die table 70; the die punch 75 remaining stationary. Powder material is deposited within chamber 33 and die cavity 74 under the influence of the vacuum within chamber 33. This filling operation continues until the die table reaches its upper movement limit, the die cavity is filled and powder covers the lower end of the filling tube, as indicated at 81, to stop the filling operation.

Figure 6:
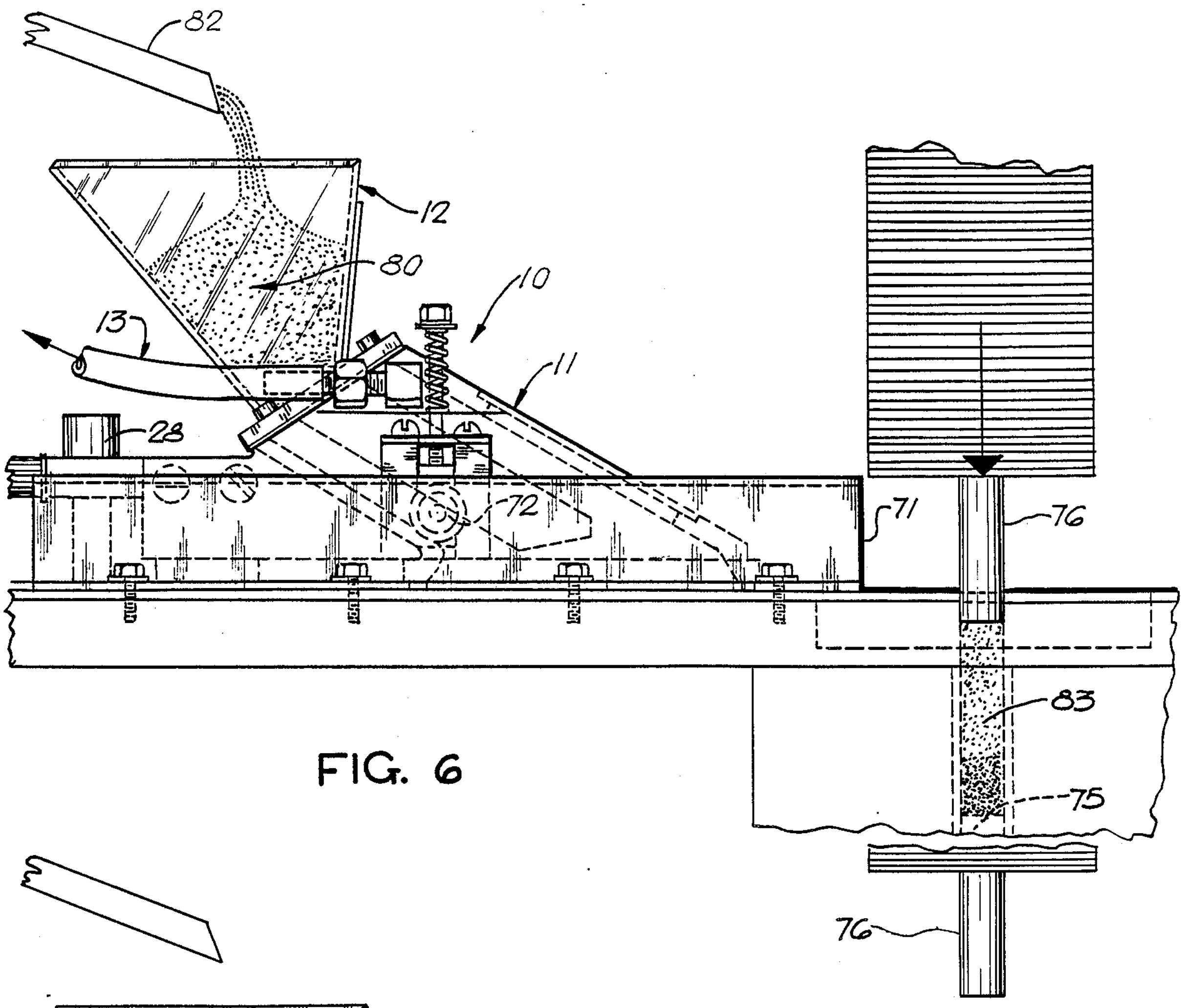

Upon completion of the filling operation, shoe means 11 is retracted to its start position, as indicated in FIG. 6. The hopper is refilled to a desired level from a supply source 82 and the upper punch is lowered to compact the powder within the die cavity. If desired the filling tube may be coupled directly to the supply source by flexible tubing, thus elminating hopper means 12.

Figure 7:
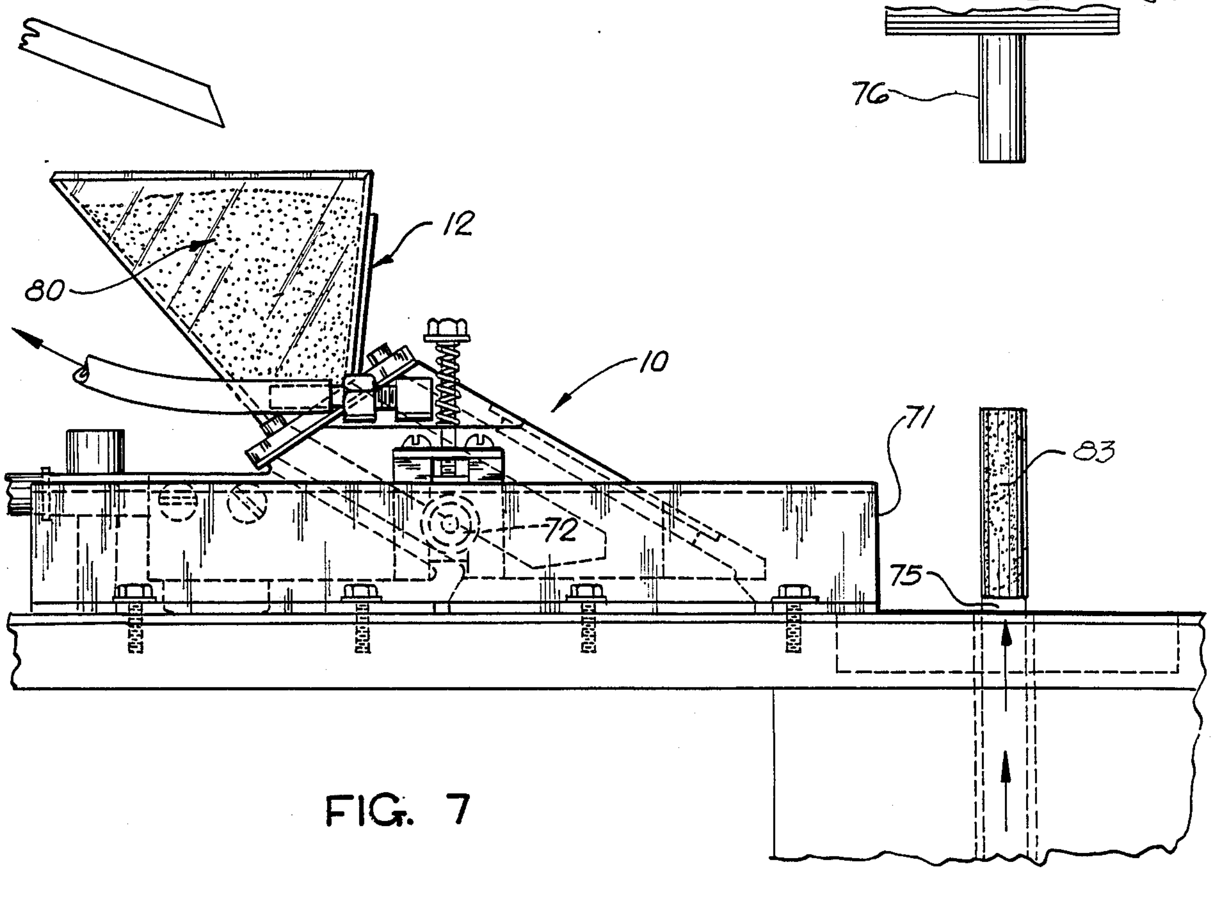

When the compacting operation of FIG. 6 is completed, the upper punch 76 is raised to its start position. The die table 70 is then lowered to its start position where the bottom punch serves to eject the "compact" or formed part 83 from the die cavity for further processing as shown in FIG. 7. A repeat of the filling and forming procedure follows.

From the foregoing it is believed those skilled in the art will readily recognize the novel advancement of the present invention over the prior art. Further it is to be understood that while the invention has been described in association with a preferred embodiment, the same is subject to modification, change and substitutions of equivalents without departing from the spirit and scope of the invention which is intended to be unlimited by the foregoing except as may appear in the following appended claims.

I claim:

1. Apparatus for providing substantially dust-free feeding of metal powders and like materials, having a self-compacting tendency resistive of gravity flow, to fill a die cavity associated with a table of a die press of the like, comprising:

an elevated open-top hopper receptive of a measured quantity of powder subject to atmospheric pressures; said hopper having a discharge opening at the lower end thereof;

shoe means undersupporting and having sealed connection with the lower end of said hopper and enclosing a filling chamber having an open bottom;

seal means on said shoe means operable to provide sealed engagement of said open bottom thereof with the die table, downwardly inclined filling tube means extending between and openly communicating with the discharge opening at the lower said of hopper and the interior of said chamber, said tube means extending into said chamber to a selected level;

vacuum generating means communicating with said chamber for providing sub-atmospheric pressures within said chamber, said cavity and said filling tube means;

means for selectively moving said hopper, said tube means and said shoe means to and from a predetermined location on said table for registering said open bottom of said shoe means with the die cavity whereby to place the interior of said cavity in sealed communication with the interior of said chamber; and means for selectively actuating said vacuum generating means to cause vacuum assisted flow of powder under the influence of gravity and atmospheric pressure from said open top hopper into said evacuated chamber and cavity.

2. The combination of claim 1, wherein said tube means is inclined at substantially 30° to the horizontal.

3. The apparatus set out in claim 1, wherein the flow of powder into said chamber is interrupted when the powder level in said chamber cover the lower end of said filling tube thereby to regulate the quantity of powder delivered to said chamber.

4. The apparatus of claim 1, wherein said hopper and said shoe means are provided with transparent walls whereby the delivery of powdered materials to said hopper and chamber may be visually observed.

* * * * *